US010817176B2

(12) United States Patent
Adams et al.

(10) Patent No.: US 10,817,176 B2
(45) Date of Patent: Oct. 27, 2020

(54) COMPUTE OFFLOAD IN BLOCK STORAGE USING VIRTUAL OBJECTS

(71) Applicant: Intel Corporation, Santa Clara, CA (US)

(72) Inventors: Ian F. Adams, Astoria, OR (US); John Keys, Beaverton, OR (US); Michael P. Mesnier, Scappoose, OR (US); Dave Minturn, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 41 days.

(21) Appl. No.: 16/011,280

(22) Filed: Jun. 18, 2018

(65) Prior Publication Data

US 2019/0042093 A1 Feb. 7, 2019

(51) Int. Cl.
*G06F 12/00* (2006.01)
*G06F 3/06* (2006.01)

(52) U.S. Cl.
CPC ............ *G06F 3/0604* (2013.01); *G06F 3/067* (2013.01); *G06F 3/0655* (2013.01); *G06F 3/0656* (2013.01); *G06F 3/0667* (2013.01); *G06F 3/0679* (2013.01)

(58) Field of Classification Search
CPC ....... H04L 45/74; H04L 69/161; H04L 49/90; H04L 43/0811; G06F 3/0659; G06F 3/067

See application file for complete search history.

(56) References Cited

U.S. PATENT DOCUMENTS

| 8,086,585 | B1* | 12/2011 | Brashers | G06F 16/137 707/705 |
| 9,639,546 | B1* | 5/2017 | Gorski | G06F 12/0808 |
| 9,860,168 | B1* | 1/2018 | Seshadri | H04L 69/22 |
| 2006/0056435 | A1* | 3/2006 | Biran | H04L 49/90 370/412 |
| 2012/0042114 | A1* | 2/2012 | Young | G06F 3/0611 710/316 |
| 2015/0006841 | A1* | 1/2015 | Chen | G06F 13/4239 711/167 |
| 2017/0192889 | A1* | 7/2017 | Sato | G06F 12/0811 |
| 2017/0250909 | A1* | 8/2017 | Krause | H04L 63/08 |

OTHER PUBLICATIONS

Kumar, "Apporach for Implementing NVMeOF based Solutions", TATA, 2018, slides (Year: 2018).*

(Continued)

*Primary Examiner* — Arvind Talukdar
(74) *Attorney, Agent, or Firm* — Schwabe, Williamson & Wyatt, P.C.

(57) ABSTRACT

Embodiments of the present disclosure may relate to a compute offload controller that may include a parser to parse a received compute offload command, and identify a block-based compute descriptor based at least in part on the compute offload command. In some embodiments, the compute offload controller may further include an offload executor to perform an operation on data in a block-based storage device based at least in part on the block-based compute descriptor. In some embodiments, the block-based compute descriptor may include a virtual input object, a virtual output object, and a compute type identifier. Other embodiments may be described and/or claimed.

22 Claims, 5 Drawing Sheets

(56) References Cited

OTHER PUBLICATIONS

Jeffrey Dean et al., "MapReduce: Simplified Data Processing on Large Clusters," In OSDI'04: Proceedings of the 6th conference on Symposium on Operating Systems Design & Implementation, (2004), 23 pages.
Eran Rom, "Bringing Compute to Openstack Swift," System and Storage Researcher, IBM Research, (2015), 17 pages.
Noah Watkins et al., "Using Lua in the Ceph distributed storage system," Lua Workshop, Oct. 2017, 64 pages.
James Hughes et al., "Seagate Kinetic Open Storage Platform," Seagate, (2014), 37 pages.
Yang Seok Ki, "In-Storage Compute: an Ultimate Solution for Accelerating I/O-intensive Applications," Memory Solutions Lab, Samsung Electronics, Aug. 13, 2015, 30 pages.
Yangwook Kang et al., "Enabling Cost-effective Data Processing with Smart SSD," IEEE 29th Symposium on Mass Storage Systems and Technologies (MSST), (2013), 12 pages.
Jianguo Wang et al., "SSD In-Storage Computing for List Intersection," Proceeding DaMoN '16 Proceedings of the 12th International Workshop on Data Management on New Hardware Article No. 4, Jun. 26-Jul. 1, 2016, 8 pages.
Gunjae Koo et al., "Summarizer: Trading Communication with Computing Near Storage," The 50th Annual IEEE/ACM International Symposium on Microarchitecture, Oct. 14-18, 2017, 13 pages.

* cited by examiner

COMPUTE OFFLOAD IN BLOCK STORAGE USING VIRTUAL OBJECTS

FIELD

Embodiments of the present disclosure generally relate to the field of computer data storage devices and, more particularly, to devices and techniques that provide compute acceleration for block-based non-volatile memory.

BACKGROUND

In computer systems, data may be stored in block-based storage such as non-volatile memory (NVM) in a Solid State Drive (SSD), either locally or over a network. The NVM may be NAND Flash memory or any other suitable form of stable, persistent storage. As the capacity and internal speed of SSDs increases, the NVM is typically limited by the speed of the input/output (I/O) controllers to which it is attached, and/or the available bandwidth over a local bus or network link. Various forms of compute-in-storage have been attempted to reduce I/O bottlenecks. Some legacy compute-in-storage approaches to address I/O limitations are problematic at least in that they rely on an object-based or key-value approach, which may be inappropriate for many applications that rely on block storage and/or may require an object-based file system to be present on a host. Other legacy compute-in-storage approaches to address this limitation are problematic at least in that they introduce complex state tracking protocols that require multiple round trips between a host and a target to initiate target-side computation and/or require applications to have direct access to block storage.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure may relate to a compute offload controller that may include a parsing logic to parse a received compute offload command and identify a block-based compute descriptor based at least in part on the compute offload command. In some embodiments, the compute offload controller may further include a compute logic to perform an operation on data in a block-based storage device based at least in part on the block-based compute descriptor. In some embodiments, the block-based compute descriptor may include a virtual input object, a virtual output object, and a compute type identifier.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

Figure 1:
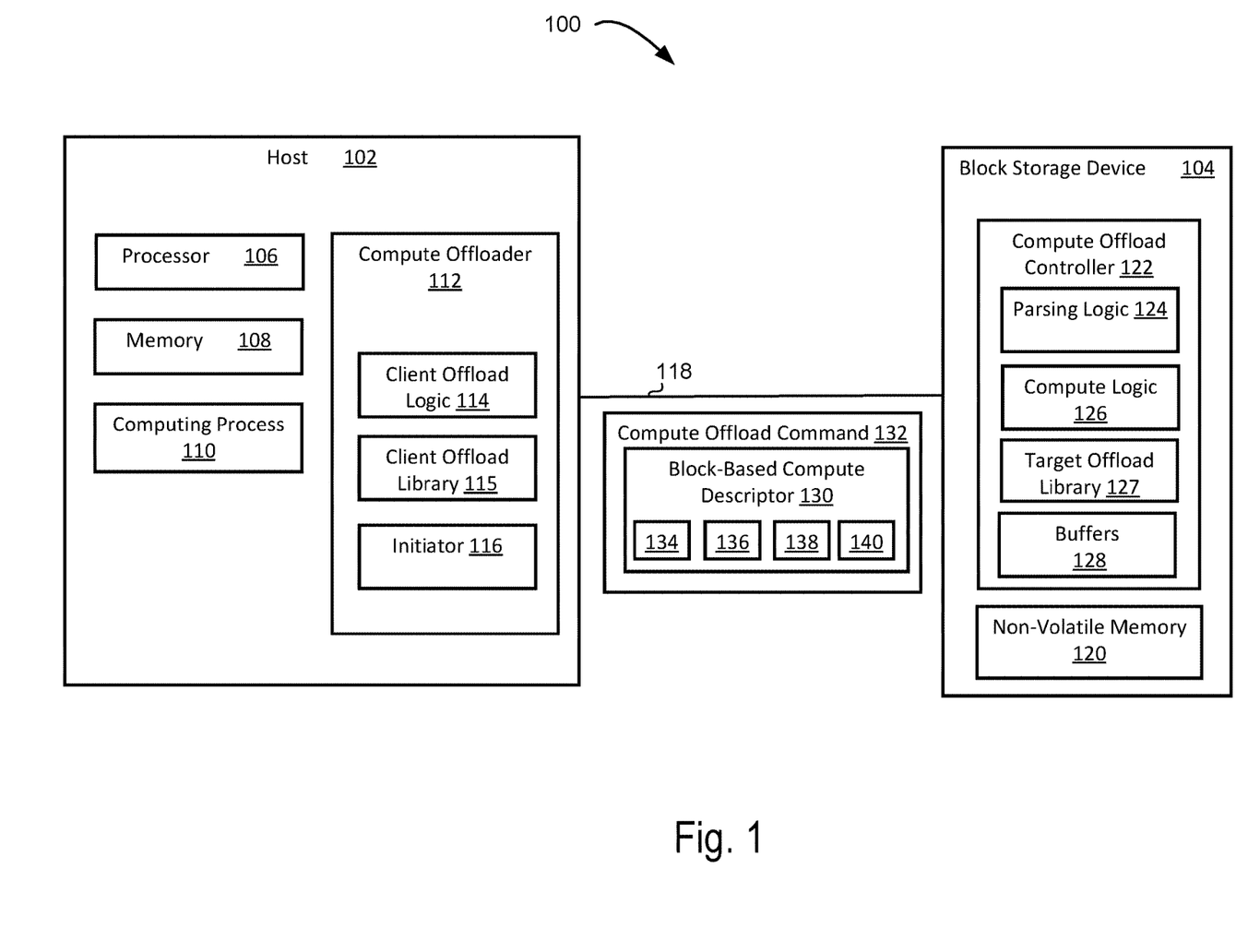
FIG. 1 depicts a block diagram of a computer system that includes a host and a block storage device, in accordance with various embodiments.

FIG. 1 is a block diagram of a computer system 100 that may include a host 102 and a block storage device 104 (e.g., a block-based storage device such as a SSD, a block-based storage server, or any other suitable block-based storage device), in accordance with various embodiments. In some embodiments, the host 102 may include a processor 106 coupled with a memory 108. In various embodiments, a computing process 110 may run on the host 102 (e.g., by processor 106 in memory 108). In some embodiments, the computing process 110 may be an application, a storage middleware, a software storage stack, an operating system, or any other suitable computing process. In various embodiments, the host 102 may further include a compute offloader 112 that may include client offload logic 114 and an initiator 116. In some embodiments, the block storage device 104 may be referred to as a storage target or a compute-enabled storage target. In some embodiments, the client offload logic 114 is referred to as a client offloader.

In some embodiments, the computing process 110 may send a compute offload request to the compute offloader 112. In various embodiments, the compute offload request may specify a higher-level object (e.g., a file) and a desired operation (e.g., a hash function such as an MD5 operation). In some embodiments, the client offload logic 114 may construct a block-based compute descriptor 130 based at least in part on the request and may package the block-based compute descriptor 130 in a compute offload command 132. In various embodiments, the compute offload command 132 may be a vendor-specific command that may contain block-based metadata (e.g., as part of block-based compute descriptor 130). In some embodiments, the client offload logic 114 may generate a virtual input object 134 based at least in part on the higher-level object specified by the compute offload request. In some embodiments, the client offload logic 114 may determine a list of one or more blocks corresponding to where the higher-level object is stored in block-based storage (e.g., NVM) to generate the virtual input object 134.

In various embodiments, the block-based compute descriptor 130 may describe the storage blocks (e.g., as mapped by virtual objects) that are to be input and/or output for computation, a function 138 (e.g., a requested compute operation as identified by a compute type identifier or an operation code) to be executed, and any additional arguments 140 to the function 138 (e.g., a search string). In various embodiments, the additional arguments 140 may also be referred to as parameters. In some embodiments, the compute offloader 112 may include a client offload library 115 that may be used by the client offload logic 114 in creation of the block-based compute descriptor 130. In some embodiments, the client offload library 115 may not be present and/or some or all aspects of the client offload library 115 may be included in the client offload logic 114 (e.g., in an ASIC). In various embodiments, the client offload logic 114 may create virtual input objects 134 and/or virtual output objects 136 (e.g., lists of block extents and object lengths), and may assign an operation code for the desired operation to be performed with these virtual objects. In some embodiments, the compute offload command 132, with the block-based compute descriptor 130, may contain all of the information needed to schedule computation against virtual objects (e.g., virtual input object 134) in the block storage device 104. In various embodiments, the block-based compute descriptor 130 may describe block-based compute operations in a protocol agnostic fashion that may work for any block-based storage device or system. In some embodiments, the virtual input object 134 may include a first set of metadata that maps the virtual input object 134 to a real input object (e.g., a file). In various embodiments, the first set of metadata may include a size of the real input object, a list of blocks composing the real input object, and/or any other metadata that describes the real input object. In some embodiments, the virtual output object 136 may include a second set of metadata that maps the virtual output object 136 to a real output object.

Various embodiments may execute general purpose, file-based computation in block-based storage, and/or may carry all execution context within a single I/O command (e.g., compute offload command 132), which may provide performance advantages over conventional approaches that require multiple roundtrips between (e.g., communication between) the host and target in order to initiate target-side computation and/or conventional approaches that have scheduling overhead that grows (e.g., linearly) with the number of blocks in a file. By carrying all execution context within a single I/O command, various embodiments may provide advantages over conventional approaches that use programmable filters that persist across READ operations and/or require separate initialization and finalization commands (e.g., introduce state tracking overhead to SSD operations). Some embodiments may not require the introduction of an object-based file system anywhere on the host, which may reduce complexity in comparison to conventional approaches. Some embodiments may provide a general purpose solution that may be suitable for use with any file system, and may function with object-based storage stacks, in contrast with some conventional approaches that require applications to have direct access to block storage and/or that are not suitable for use with a file system.

In some embodiments, the initiator 116 may communicate the compute offload command 132 that includes the block-based compute descriptor 130 to the block storage device 104 over a link 118. In some embodiments, the link 118 may be a transport fabric such as an internet small computer system interface (iSCSI), a NVM express over fabrics (NVMeOF) interface, or any other suitable transport fabric. In other embodiments, the link 118 may be a local bus interface such as Peripheral Component Interconnect Express (PCIe), or any other suitable interface.

In various embodiments, the block storage device 104 may include NVM 120 and a compute offload controller 122. In some embodiments, the compute offload controller 122 may be a NVM controller, a SSD controller, a storage server controller, or any other suitable block-based storage controller or portion thereof. Although NVM 120 is shown as single element for clarity, it should be understood that multiple NVM 120 may be present in the block storage device 104 and/or controlled at least in part by the compute offload controller 122 in various embodiments. In some embodiments, the compute offload controller 122 may include parsing logic 124 and compute logic 126. In various embodiments, the parsing logic 124 may parse a compute offload command (e.g., compute offload command 132) and/or compute descriptor (e.g., block-based compute descriptor 130) received from the host 102. In some embodiments, the parsing logic 124 identifies a compute descriptor (e.g., block-based compute descriptor 130) packaged in a compute offload command (e.g., compute offload command 132), and parses the identified compute descriptor to identify a virtual input object (e.g., virtual input object 134), a virtual output object (e.g., virtual output object 136), a requested compute operation (e.g., function 138), and/or other parameters (e.g., a search string specified by additional arguments 140). In various embodiments, the compute logic 126 performs the requested compute operation. In some embodiments, the compute logic 126 may perform the requested compute operation 138 against the virtual input object 134 and may store a result of the requested compute operation in the virtual output object 136. In some embodiments, one or more standard operations (e.g., read and write operations) of the NVM 120 may continue to normally occur while the offloaded compute operation is performed. In some embodiments, the compute offload controller 122 may include a target offload library 127 that may be used by the parsing logic 124 in parsing the compute offload command and/or the compute descriptor, and that may be used by the compute logic 126 to perform the requested compute operation. In some embodiments, the target offload library 127 may not be present and/or some or all aspects of the target offload library 127 may be included in the parsing logic 124 and/or the compute logic 126 (e.g., in an ASIC). In some embodiments, if one or more expected items is not included in the descriptor (e.g., a virtual output object), a default value may be used or a default action may be performed if possible. Various embodiments may avoid the problems associated with conventional approaches that add complex object-based devices or object-based file systems by creating virtual objects in the block storage system and performing computation against the virtual objects. In some embodiments, the parsing logic 124 is referred to as a parser and the compute logic 126 is referred to as an offload executor.

In various embodiments, the virtual input object 134 may include a first list of one or more blocks. In some embodiments, the first list of one or more blocks may include a list of starting addresses and a corresponding list of block lengths to form a first set of block extents. In various embodiments, the virtual output object 136 may include a second list of one or more blocks. In some embodiments, the second list of one or more blocks may include a list of starting addresses and a corresponding list of block lengths to form a second set of block extents. In other embodiments, the first and/or second set of block extents may be specified with a list of starting addresses and a list of ending addresses, and/or may include a total virtual object length (virtual input object length or virtual output object length respectively). In some embodiments, the requested compute operation 138 may be a function (e.g., compression, hashing, searching, image resizing, checksum computation, or any other suitable function) which may be applied to the first list of one or more blocks and written to the second list of one or more blocks. In some embodiments, the blocks associated with the virtual input object 134 and/or the virtual output object 136 may be sectors. In some embodiments, the starting addresses may be logical block addresses (LBAs), the first and second lists one or more blocks may be otherwise identified by LBAs, or the first and/or second lists of one or more blocks may be identified in any other suitable manner. In various embodiments, the virtual input object 134 may specify the block locations in NVM 120 where file data is stored, and/or the virtual output object 136 may specify the block locations in NVM 120 where a result is to be written. In some embodiments, the virtual output object 136 may specify that the result is to be returned to the host 102.

In various embodiments, the parsing logic 124, the compute logic 126, and/or other functions of the compute offload controller 122 may be performed with one or more processors or central processing units (CPUs), one or more field programmable gate arrays (FPGAs), one or more application specific integrated circuits (ASICs), an intelligent storage acceleration library (ISA-L), a data streaming architecture, and/or any other suitable combination of hardware and/or software, not shown for clarity. In some embodiments, the compute offload controller 122 may include one or more buffers 128 that may include input buffers, output buffers, and/or input/output buffers in various embodiments. In some embodiments, one or more components of the compute offload controller 122 (e.g., compute logic 126 and/or parsing logic 124) may use the buffers 128 in read and/or write operations to the NVM 120.

In some embodiments, the block storage device 104 may be a SSD that may be coupled with the host 102 over a local bus such as PCIe, or that may be coupled with the host 102 over a network in various embodiments. In some embodiments, the block storage device 104 may be a storage server that may be part of a disaggregated computing environment. In various embodiments, the host 102 and/or the block storage device 104 may include additional elements, not shown for clarity (e.g., the block storage device 104 may include one or more processors and system memory).

In various embodiments, the NVM 120 may be a memory whose state is determinate even if power is interrupted to the device. In some embodiments, the NVM 120 may include a block addressable mode memory device, such as NAND or NOR technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). In some embodiments, the NVM 120 may include a byte-addressable write-in-place three dimensional crosspoint memory device, or other byte addressable write-in-place NVM devices, such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric transistor random access memory (FeTRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, a combination of any of the above, or other suitable memory.

In various embodiments, offloaded compute operations (e.g., calculation of checksums, bitrot detection) may see accelerated completion times and/or reduced I/O traffic in comparison to legacy approaches.

Figure 2:
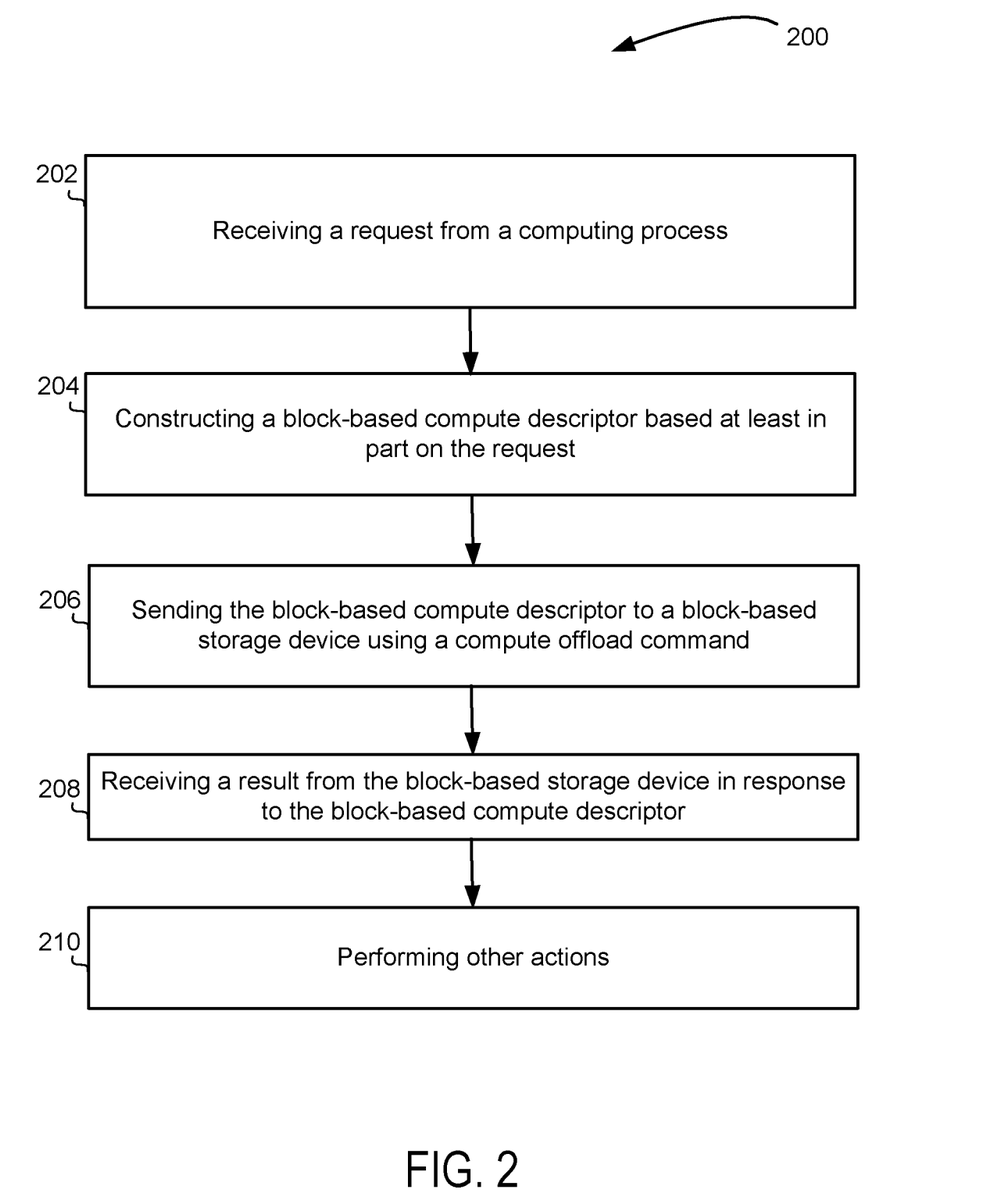
FIG. 2 is a flow diagram of a technique for offloading compute operations to a block storage device, in accordance with various embodiments.

FIG. 2 is a flow diagram of a technique 200 for offloading compute operations to a block storage device, in accordance with various embodiments. In some embodiments, some or all of the technique 200 may be practiced by components shown and/or described with respect to the computer system 100 of FIG. 1 or a portion thereof (e.g., compute offloader 112), the computer device 400 of FIG. 4 or a portion thereof (e.g., compute offloader 450), or some other component shown or described herein with respect to any other Figure.

In some embodiments, at a block 202, the technique 200 may include receiving a request from a computing process (e.g., receiving a request from computing process 110 by compute offloader 112). In various embodiments, the request may include a higher-level object (e.g., a file), a requested operation or computation, and one or more additional parameters (e.g., a search string). However, it should be understood that the request may include any other suitable parameters in other embodiments.

In various embodiments, at a block 204, the technique 200 includes constructing a block-based compute descriptor (e.g., block-based compute descriptor 130) based at least in part on the request. In some embodiments, constructing the block-based compute descriptor may include constructing an extent map (e.g., a block list for a virtual input object) based at least in part on a higher-level object (e.g., a file) included in the request. In some embodiments, the extent map may include a list of LBAs.

In some embodiments, at a block 206, the technique 200 includes sending the block-based compute descriptor to a block-based storage device (e.g., block storage device 104 or block storage device 452) using a compute offload command. In some embodiments, sending the block-based compute descriptor to the block-based storage device may include loading the block-based compute descriptor into a payload (e.g., a compute offload command). In various embodiments, the block-based storage device may be a NVM storage device.

In some embodiments, the compute offload command sent at the block 206 may be a SCSI command transported over a network using an iSCSI transport protocol. In some embodiments, a SCSI command transported over a network using an iSCSI transport protocol may be referred to as an iSCSI command. In some embodiments, the compute offload command sent at the block 206 may be an iSCSI command that may use an operation code (opcode) designated as (0x99). In some embodiments, the (0x99) command may be defined as a bi-directional command that may include an output buffer and an input buffer. In some embodiments, the output buffer of the (0x99) command may be used to contain the compute descriptor and the input buffer of the (0x99) command may be used to contain a result performed in response to an operation described in the compute descriptor. In some embodiments, the (0x99) command may be defined as a vendor-specific command, and/or may be referred to as an EXEC command. In other embodiments, the compute offload command may be a SCSI command defined in similar fashion to the iSCSI command discussed above, but transported directly to an attached device (e.g., over a local bus such as a PCIe bus). It should be understood that the (0x99) command is mentioned for purposes of illustrating an example, and that any suitable opcode designation or other compute offload command identifier may be used in various embodiments.

In some embodiments, the compute offload command sent at the block 206 may include one or more NVMe commands. In some embodiments, the compute offload command may be a fused NVMe command that includes two opcodes. In some embodiments, the fused NVMe command may include a first opcode that may be used to transfer the compute descriptor from a host to a block based storage device, followed by a second opcode that may be used to transfer a result back to the host from the block based storage device. In this fashion, the fused NVMe command may result in a virtual bi-directional command by fusing two unidirectional commands. In some embodiments, the first opcode may be a vendor-specific opcode designated as (0x99) and/or may be referred to as an EXEC_WRITE command. In some embodiments, the second opcode may be a vendor-specific opcode designated as (0x9a) and/or may be referred to as an EXEC_READ command. In some embodiments, the EXEC_WRITE command may be equivalent to a first phase of the iSCSI bi-directional EXEC command discussed above (e.g., contains the compute descriptor) and/or the EXEC_READ command may be equivalent to a second phase of the iSCSI bi-directional EXEC command, discussed above (e.g., returns the result of the operation). In some embodiments, the fused NVMe command may be sent over a network using a NVMeOF transport protocol. In some embodiments, a NVMe command transported over a network using a NVMeOF transport protocol may be referred to as a NVMeOF command. In some embodiments, the fused NVMe command may be transported directly to an attached device (e.g., over a local bus such as a PCIe bus). In some embodiments, an iSCSI or SCSI compute offload command (e.g., EXEC) may be translated to the fused NVMe command discussed above before sending to a NVM storage device. It should be understood that any other suitable compute offload command may be used in other embodiments. It should be understood that the (0x99) and (0x9a) vendor-specific opcodes are mentioned for purposes of illustrating an example, and that any suitable opcode designation(s) or other compute offload command identifier(s) may be used in various embodiments.

In some embodiments, at a block 208, the technique 200 may include receiving a result from the block-based storage device in response to the block-based compute descriptor. In various embodiments, at a block 210, the technique 200 may include performing other actions.

Figure 3:
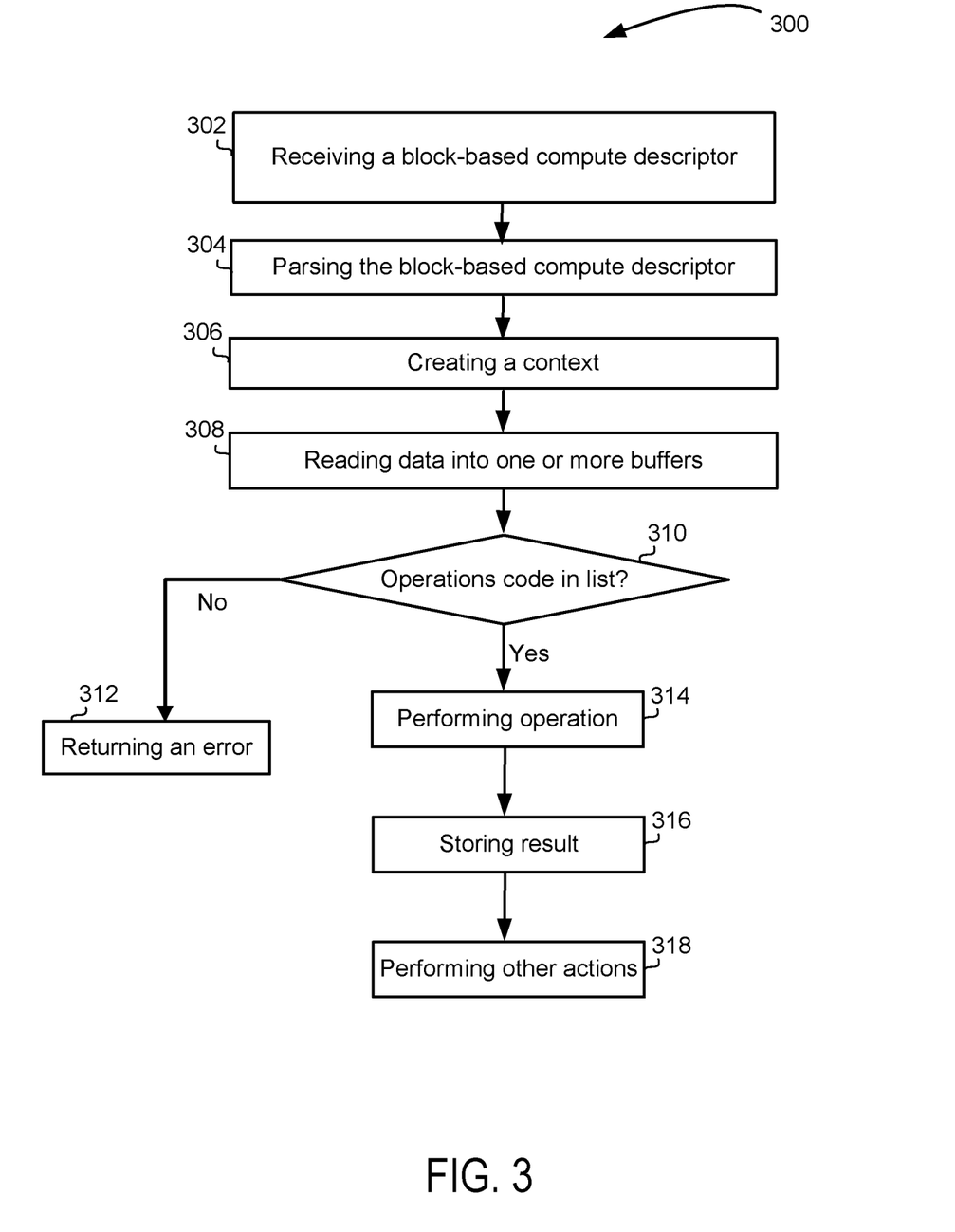
FIG. 3 is a flow diagram of a technique for performing offloaded compute operations with a block storage device, in accordance with various embodiments.

FIG. 3 is a flow diagram of a technique 300 for performing offloaded compute operations with a block storage device, in accordance with various embodiments. In some embodiments, some or all of the technique 300 may be practiced by components shown and/or described with respect to the computer system 100 of FIG. 1 or a portion thereof (e.g., block storage device 104 and/or compute offload controller 122), the computer device 400 of FIG. 4 or a portion thereof (e.g., block storage device 452 and/or compute offload controller 454), or some other component shown or described herein with respect to any other Figure.

In some embodiments, at a block 302, the technique 300 may include receiving a block-based compute descriptor (e.g., receiving block-based compute descriptor 130 at block storage device 104 from compute offloader 112, or at block storage device 452 from compute offloader 450). In various embodiments, at a block 304, the technique 300 may include parsing the block-based compute descriptor (e.g., with parsing logic 124). In some embodiments, at a block 306, the technique 300 may include creating a context. In various embodiments, the parsing logic 124 and/or any other suitable component of the compute offload controller 122 or the compute offload controller 454 may create the context. In some embodiments, the context may include one or more of: an operation to execute (e.g., a text search); one or more arguments for the operation (e.g., a search string); whether the operation can expect data to arrive across multiple calls or requires all data to be input as a single buffer; and/or any additional operation specific state information (e.g., a current status of a checksum calculation for chunked inputs). In some embodiments, whether the operation can expect data to arrive across multiple calls may be opaque to a calling application (e.g., computing process 110), but may be relevant for performing the operation, which may require reading multiple block extents for a particular virtual object. In some embodiments, the context may be an operation context that may provide temporary space for the input and results of an operation.

In various embodiments, at a block 308, the technique 300 may include reading data into one or more buffers (e.g., an input buffer of buffers 128). In some embodiments, reading data into the one or more buffers may include performing a check to determine whether sufficient data has been read into the one or more buffers for execution of a requested operation before proceeding to the decision block 310. In some embodiments, at a decision block 310, the technique 300 may include determining whether an operations code from the block-based compute descriptor is in a list of available operations. If, at the decision block 310, it is determined that the operations code is not in the list of available operations, the technique 300 may include returning an error at a block 312. If, at the decision block 310, it is determined that the operations code is in the list of available operations, the technique 300 may include performing an operation based at least in part on the operations code at a block 314. In some embodiments (e.g., where an operation may be performed on subsets of data, rather than the entire data set), the technique 300 may include looping through the actions performed at the block 308 and the block 314 to perform the operation on subsets of a virtual input object, until the entire virtual input object has been processed.

In some embodiments, at a block 316, the technique 300 may include storing a result of the operation performed at the block 314. In various embodiments, the result may be stored at a virtual output object location and/or may be returned to a host (e.g., host 102). In some embodiments, returning the result to a host may include copying result data into a return payload of a compute offload command. In some embodiments, at a block 318, the technique 300 may include performing other actions. In various embodiments, one or more of the actions performed with the technique 300 may be specified in hardware, fixed as a static library, dynamically loaded at run time, or may be implemented with any suitable combination of hardware and/or software. In some embodiments, one or more actions described with respect to the technique 300 may be performed in a different order (e.g., determining whether the operations code is in the list at the block 310 may be performed before reading data into one or more buffers at the block 308, so an error may be returned before reading data into a buffer if the operations code is not in the list).

Figure 4:
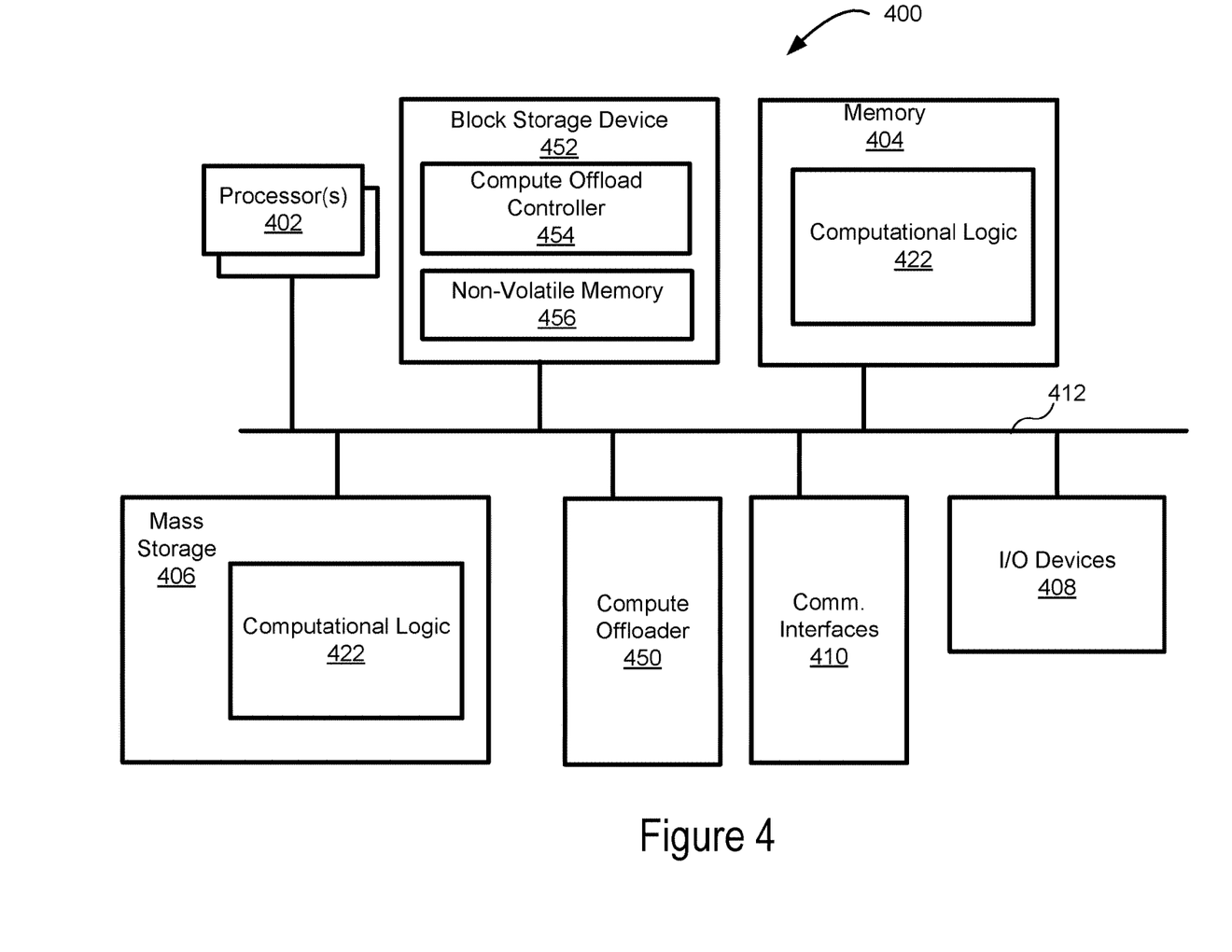
FIG. 4 schematically illustrates an example computing device that includes a block storage device with a non-volatile memory controller as described herein, in accordance with various embodiments.

FIG. 4 illustrates a block diagram of an example computing device 400 that may be suitable for use with various components of FIG. 1, the technique 200 of FIG. 2, and/or the technique 300 of FIG. 3, in accordance with various embodiments.

As shown, computing device 400 may include one or more processors or processor cores 402 and system memory 404. For the purpose of this application, including the claims, the terms "processor" and "processor cores" may be considered synonymous, unless the context clearly requires otherwise. The processor 402 may include any type of processors, such as a central processing unit (CPU), a microprocessor, and the like. The processor 402 may be implemented as an integrated circuit having multi-cores, e.g., a multi-core microprocessor. In some embodiments, processors 402, in addition to cores, may further include hardware accelerators, e.g., hardware accelerators implemented with Field Programmable Gate Arrays (FPGA). The computing device 400 may include mass storage devices 406 (such as diskette, hard drive, non-volatile memory (NVM) (e.g., compact disc read-only memory (CD-ROM), digital versatile disk (DVD), any other type of suitable NVM, and so forth). In general, system memory 404 and/or mass storage devices 406 may be temporal and/or persistent storage of any type, including, but not limited to, volatile and non-volatile memory, optical, magnetic, and/or solid state mass storage, and so forth. Volatile memory may include, but is not limited to, static and/or dynamic random access memory (DRAM). Non-volatile memory may include, but is not limited to, electrically erasable programmable read-only memory, phase change memory, resistive memory, and so forth. In some embodiments, the mass storage devices 406 may include the NVM 120 described with respect to FIG. 1.

The computing device 400 may further include I/O devices 408 (such as a display (e.g., a touchscreen display), keyboard, cursor control, remote control, gaming controller, image capture device, and so forth) and communication interfaces 410 (such as network interface cards, modems, infrared receivers, radio receivers (e.g., Bluetooth), and so forth), one or more antennas, and/or any other suitable component.

The communication interfaces 410 may include communication chips (not shown for clarity) that may be configured to operate the computing device 400 in accordance with a local area network (LAN) (e.g., Ethernet) and/or a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 410 may operate in accordance with other wireless protocols in other embodiments.

In various embodiments, computing device 400 may include a block storage device 452 that may include a compute offload controller 454 and/or a NVM 456. In some embodiments, the block storage device 452 or components thereof may be coupled with other components of the computing device 400. In some embodiments, the block storage device 452 may include a different number of components (e.g., NVM 456 may be located in mass storage 406) or may include additional components of computing device 400 (e.g., processor 402 and/or memory 404 may be a part of block storage device 452). In some embodiments, the compute offload controller 454 may be configured in similar fashion to the compute offload controller 122 described with respect to FIG. 1.

In various embodiments, the computing device 400 may include a compute offloader 450. In some embodiments, the compute offloader 450 may be configured in similar fashion to the compute offloader 112 described with respect to FIG. 1. In some embodiments, the computing device 400 may include both the compute offloader 450 and the block storage device 452 (e.g., as an SSD), and the compute offloader 450 may send compute offload commands (e.g., NVMe or SCSI) that contain a compute descriptor to the block storage device 452 over a local bus. In other embodiments, a first computing device 400 may include the compute offloader 450, a second computing device 400 may include the block storage device 452, and the compute offloader 450 may send compute offload commands (e.g., iSCSI or NVMeOF) to the block storage device 452 over a network (e.g., via communications interfaces 410). In some embodiments, the first computing device 400 and the second computing device 400 may be components of a disaggregated computing environment, where the second computing device 400 with the block storage device 452 is a storage server that may include a compute-in-storage capability provided by the block storage device 452.

The above-described computing device 400 elements may be coupled to each other via system bus 412, which may represent one or more buses. In the case of multiple buses, they may be bridged by one or more bus bridges (not shown). Each of these elements may perform its conventional functions known in the art. In particular, system memory 404 and mass storage devices 406 may be employed to store a working copy and a permanent copy of the programming instructions for the operation of various components of computing device 400, including but not limited to an operating system of computing device 400, one or more applications, operations associated with computing device 400, operations associated with the block storage device 452, and/or operations associated with the compute offloader 450, collectively denoted as computational logic 422. The various elements may be implemented by assembler instructions supported by processor(s) 402 or high-level languages that may be compiled into such instructions. In some embodiments, the computing device 400 may be implemented as a fixed function ASIC, a FPGA, or any other suitable device with or without programmability or configuration options.

The permanent copy of the programming instructions may be placed into mass storage devices 406 in the factory, or in the field through, for example, a distribution medium (not shown), such as a compact disc (CD), or through communication interface 410 (from a distribution server (not shown)). That is, one or more distribution media having an implementation of the agent program may be employed to distribute the agent and to program various computing devices.

The number, capability, and/or capacity of the elements 408, 410, 412 may vary, depending on whether computing device 400 is used as a stationary computing device, such as a set-top box or desktop computer, or a mobile computing device, such as a tablet computing device, laptop computer, game console, or smartphone. Their constitutions are otherwise known, and accordingly will not be further described.

For some embodiments, at least one of processors 402 may be packaged together with computational logic 422 configured to practice aspects of embodiments described herein to form a System in Package (SiP) or a System on Chip (SoC).

In various implementations, the computing device 400 may comprise one or more components of a data center, a laptop, a netbook, a notebook, an ultrabook, a smartphone, a tablet, an ultra mobile PC, or a mobile phone. In some embodiments, the computing device 400 may include one or more components of a server. In further implementations, the computing device 400 may be any other electronic device that processes data.

Figure 5:
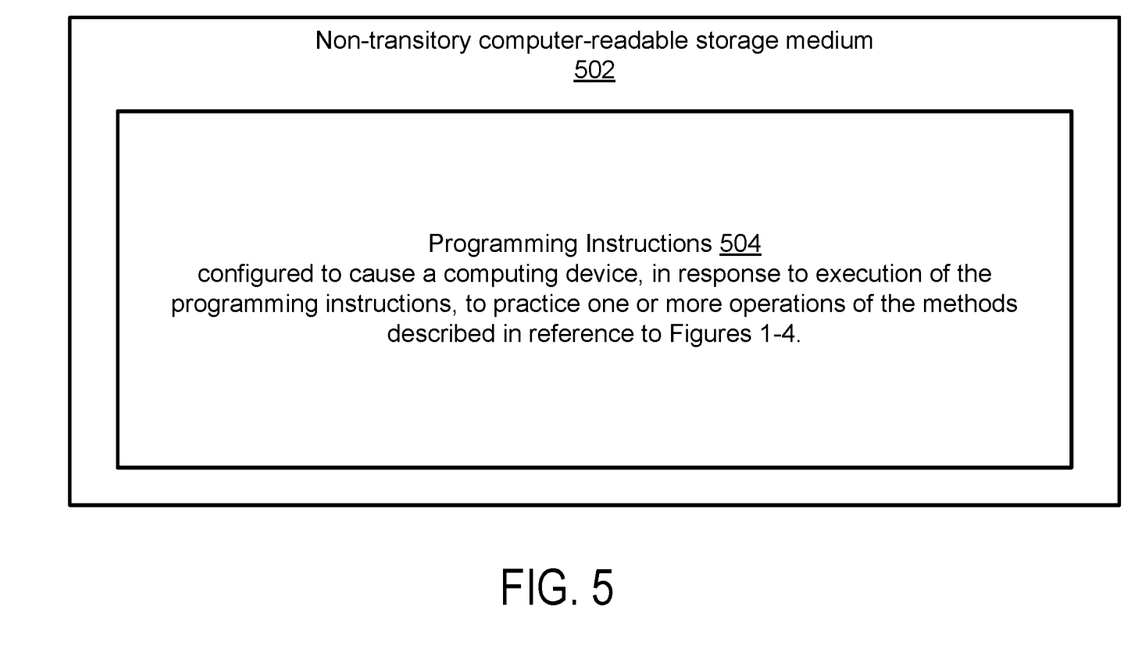
FIG. 5 illustrates an example storage medium with instructions configured to enable an apparatus to practice various aspects of the present disclosure, in accordance with various embodiments.

FIG. 5 illustrates an example computer-readable storage medium 502 having instructions configured to practice all or selected ones of the operations associated with the computing device 400, earlier described with respect to FIG. 4; the computer system 100, compute offload controller 122, and/or the compute offloader 112 described with respect to FIG. 1; the technique 200 described with respect to FIG. 2; and/or the technique 300 of FIG. 3, in accordance with various embodiments.

As illustrated, computer-readable storage medium 502 may include a number of programming instructions 504. The storage medium 502 may represent a broad range of non-transitory persistent storage medium known in the art, including but not limited to flash memory, dynamic random access memory, static random access memory, an optical disk, a magnetic disk, etc. Programming instructions 504 may be configured to enable a device, e.g., part or all of the computer system 100 and/or the computing device 400, such as the compute offload controller 122, the compute offloader 112, and/or other components of the computer system 100, in response to execution of the programming instructions 504, to perform, e.g., but not limited to, various operations described for the compute offload controller 122, the parsing logic 124, the compute logic 126, the compute offloader 112, the client offload logic 114, the initiator 116, the block storage device 452 and/or the compute offloader 450 of FIG. 4, the technique 200 described with respect to FIG. 2, and/or the technique 300 of FIG. 3. In alternate embodiments, programming instructions 504 may be disposed on multiple computer-readable storage media 502. In an alternate embodiment, storage medium 502 may be transitory, e.g., signals encoded with programming instructions 504.

Referring back to FIG. 4, for an embodiment, at least one of processors 402 may be packaged together with memory having all or portions of computational logic 422 configured to practice aspects shown or described for the compute offload controller 122, the parsing logic 124, the compute logic 126, the compute offloader 112, the client offload logic 114, the initiator 116, and/or other components of computer system 100 shown in FIG. 1, the computing device 400, including the block storage device 452 and/or the compute offloader 450 of FIG. 4, the technique 200 described with respect to FIG. 2, and/or the technique 300 of FIG. 3. For an embodiment, at least one of processors 402 may be packaged together with memory having all or portions of computational logic 422 configured to practice aspects described for the compute offload controller 122, the parsing logic 124, the compute logic 126, the compute offloader 112, the client offload logic 114, the initiator 116, and/or other components of computer system 100 shown in FIG. 1, the computing device 400, including the block storage device 452 and/or the compute offloader 450 of FIG. 4, the technique 200 described with respect to FIG. 2, and/or the technique 300 of FIG. 3 to form a System in Package (SiP). For an embodiment, at least one of processors 402 may be integrated on the same die with memory having all or portions of computational logic 422 configured to practice aspects described for the compute offload controller 122, the parsing logic 124, the compute logic 126, the compute offloader 112, the client offload logic 114, the initiator 116, and/or other components of computer system 100 shown in FIG. 1, the computing device 400, including the block storage device 452 and/or the compute offloader 450 of FIG. 4, the technique 200 described with respect to FIG. 2, and/or the technique 300 of FIG. 3. For an embodiment, at least one of processors 402 may be packaged together with memory having all or portions of computational logic 422 configured to practice aspects of the compute offload controller 122, the parsing logic 124, the compute logic 126, the compute offloader 112, the client offload logic 114, the initiator 116, and/or other components of computer system 100 shown in FIG. 1, the computing device 400, including the block storage device 452 and/or the compute offloader 450 of FIG. 4, the technique 200 described with respect to FIG. 2, and/or the technique 300 of FIG. 3 to form a System on Chip (SoC).

Machine-readable media (including non-transitory machine-readable media, such as machine-readable storage media), methods, systems and devices for performing the above-described techniques are illustrative examples of embodiments disclosed herein. Additionally, other devices in the above-described interactions may be configured to perform various disclosed techniques.

Various components described herein may be a means for performing the operations or functions described. Each component described herein may include software, hardware, or a combination of these. The components may be implemented as software modules, hardware modules, special-purpose hardware (e.g., application specific hardware, application specific integrated circuits (ASICs), digital signal processors (DSPs), etc.), embedded controllers, hard-wired circuitry, and/or any other suitable hardware or software component. Besides what is described herein, various modifications may be made to the disclosed embodiments and implementations of the invention without departing from their scope.

EXAMPLES

Example 1 includes a compute offload controller comprising: a parser to parse a received compute offload command and identify a block-based compute descriptor based at least in part on the compute offload command; and an offload executor to perform an operation on data in a block-based storage device based at least in part on the block-based compute descriptor.

Example 2 may include the subject matter of Example 1, wherein the parser is further to parse the block-based compute descriptor to identify a virtual input object and a compute type identifier, and wherein the offload executor is to perform the operation based at least in part on the compute type identifier and the virtual input object.

Example 3 may include the subject matter of any one of Examples 1-2, wherein the parser is further to parse the block-based compute descriptor to identify a virtual output object, and wherein the offload executor is to store a result based at least in part on the virtual output object.

Example 4 may include the subject matter of any one of Examples 1-3, wherein the parser and the offload executor are coupled with a plurality of non-volatile memory (NVM) devices.

Example 5 may include the subject matter of Example 4, wherein the plurality of NVM devices are in a disaggregated storage server.

Example 6 may include the subject matter of any one of Examples 1-5, wherein the parser and the offload executor are included in the block-based storage device, wherein the block-based storage device is a NVM storage device that includes a NVM coupled with the offload executor.

Example 7 may include the subject matter of Example 6, wherein the NVM storage device is a solid state drive (SSD).

Example 8 may include the subject matter of any one of Examples 1-6, wherein the compute offload command is received over a network with an internet small computer system interface (iSCSI) transport protocol or a non-volatile memory express over fabrics (NVMeOF) transport protocol.

Example 9 includes at least one non-transitory computer-readable medium comprising instructions stored thereon that, in response to execution of the instructions by one or more processors cause a computing device to: construct a block-based compute descriptor based at least in part on a received request from a computing process; and send the block-based compute descriptor to a block-based storage device using a compute offload command.

Example 10 may include the subject matter of Example 9, wherein the block-based compute descriptor includes a virtual input object, a virtual output object, and a compute type identifier.

Example 11 may include the subject matter of any one of Examples 9-10, wherein the instructions are further to cause the computing device to receive a result from the block-based storage device in response to the block-based compute descriptor.

Example 12 may include the subject matter of any one of Examples 9-11, wherein the instructions are further to cause the computing device to send the block-based compute descriptor over a network using an internet small computer system interface (iSCSI) transport protocol or a non-volatile memory express over fabrics (NVMeOF) transport protocol.

Example 13 may include the subject matter of any one of Examples 9-12, wherein the block-based storage device is a storage server in a disaggregated computing environment.

Example 14 includes a method of performing an offloaded compute operation, the method comprising: identifying a block-based compute descriptor in a received compute offload command, wherein the block-based compute descriptor includes a virtual input object, a virtual output object, and a compute type identifier; and performing an operation on data in a block-based storage device based at least in part on the compute type and the virtual input object.

Example 15 may include the subject matter of Example 14, further comprising parsing the block-based compute descriptor.

Example 16 may include the subject matter of any one of Examples 14-15, wherein the virtual input object includes a list of input blocks and an input length.

Example 17 may include the subject matter of any one of Examples 14-16, further comprising loading the data from a non-volatile memory (NVM) into a buffer based at least in part on the virtual input object, wherein performing the operation includes performing the operation based at least in part on the data loaded into the buffer.

Example 18 may include the subject matter of any one of Examples 14-17, wherein the compute type identifier includes an operation code, and the method further comprises: comparing the operation code to a list of available operations; performing the operation in response to the operation code is included in the list of available operations; and returning an error in response to the operation code is not included in the list of available operations.

Example 19 may include the subject matter of any one of Examples 14-18, wherein the compute type identifier identifies a search, compress, checksum, or resize operation.

Example 20 may include the subject matter of any one of Examples 14-19, wherein the compute offload command is received over a network using an internet small computer system interface (iSCSI) transport protocol or a non-volatile memory express over fabrics (NVMeOF) transport protocol.

Example 21 includes at least one non-transitory computer-readable medium comprising instructions stored thereon that, in response to execution of the instructions by one or more processors cause a computing device to: identify a block-based compute descriptor in a received compute offload command, wherein the block-based compute descriptor includes a virtual input object and a compute type identifier; and perform an operation on data in a block-based storage device based at least in part on the compute type and the virtual input object.

Example 22 may include the subject matter of Example 21, wherein the instructions are further to cause the computing device to parse the block-based compute descriptor.

Example 23 may include the subject matter of any one of Examples 21-22, wherein the compute offload command is received over a network with an internet small computer system interface (iSCSI) transport protocol or a non-volatile memory express over fabrics (NVMeOF) transport protocol.

Example 24 may include the subject matter of any one of Examples 21-22, wherein the compute offload command is a SCSI command or a NVMe command received over a local bus.

Example 25 may include the subject matter of any one of Examples 21-24, wherein the block-based compute descriptor further includes a virtual output object, and wherein the instructions are further to cause the computing device to store a result based at least in part on the virtual output object.

Example 26 includes an apparatus comprising means for performing the method of Example 14.

Example 27 may include the subject matter of Example 26, further comprising means for performing the method of any one of Examples 15-20, or some other Example herein.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions stored thereon that, when executed, result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

We claim:

1. A compute offload controller comprising:
a parser to parse a received compute offload command, wherein the compute offload command includes information to schedule block-based compute operations against virtual objects in a block storage device that includes the compute offload controller, wherein the compute offload command comprises a fused non-volatile memory (NVM) command that includes first and second opcodes, wherein the information included in the compute offload command includes a block-based compute descriptor that describes the block-based compute operations in a protocol-agnostic fashion applicable to block-based storage systems, wherein the block-based compute descriptor includes storage blocks mapped to the virtual objects that are to be input and output for the block-based compute operations, and a requested compute operation against the virtual objects in the block storage device, wherein the parser is to identify, from the block-based compute descriptor, a virtual input object, a virtual output object, and the requested compute operation, wherein the first opcode of the compute offload command is to provide a transfer of the block-based compute descriptor from a host to the block storage device, and the second opcode of the compute offload command is to provide a transfer of a result of the requested compute operation to the host from the block storage device; and
an offload executor to perform the requested compute operation against the virtual input object and store a result of the requested computed operation in the virtual output object, wherein the compute offload controller is coupled with at least one NVM of the block storage device, wherein the requested compute operation against the virtual input object is performed independently from read or write operations that are to occur in the NVM.

2. The compute offload controller of claim 1, wherein the parser and the offload executor are coupled with a plurality of NVM devices.

3. The compute offload controller of claim 2, wherein the plurality of NVM devices are in a disaggregated storage server.

4. The compute offload controller of claim 1, wherein the parser and the offload executor are included in the block-based storage device, wherein the block-based storage device is a NVM storage device that includes the NVM coupled with the offload executor.

5. The compute offload controller of claim 4, wherein the NVM storage device is a solid state drive (SSD).

6. The compute offload controller of claim 1, wherein the compute offload command is received over a network with an internet small computer system interface (iSCSI) transport protocol or a non-volatile memory express over fabrics (NVMeOF) transport protocol.

7. At least one non-transitory computer-readable medium comprising instructions stored thereon that, in response to execution of the instructions by one or more processors, cause a computing device to:
construct a block-based compute descriptor based at least in part on a received request from a computing process; and
send the block-based compute descriptor to a block-based storage device using a compute offload command, wherein the compute offload command comprises a fused non-volatile memory (NVM) command that includes first and second opcodes,
wherein the block-based compute descriptor includes information to schedule block-based compute operations against virtual objects in a block storage device in a protocol-agnostic fashion applicable to block-based storage systems, wherein the block-based compute descriptor includes storage blocks mapped to the virtual objects that are to be input and output for the block-based compute operations, and a requested compute operation against the virtual objects in the block storage device, wherein the first opcode of the compute offload command is to provide a transfer of the block-based compute descriptor from the computing device to the block storage device, and the second opcode of the compute offload command is to provide a transfer of a result of the requested compute operation to the computing device from the block storage device.

8. The at least one non-transitory computer-readable medium of claim 7, wherein the block-based compute descriptor includes a virtual input object, a virtual output object, and a compute type identifier.

9. The at least one non-transitory computer-readable medium of claim 7, wherein the instructions are further to cause the computing device to receive the result from the block-based storage device in response to the block-based compute descriptor, based at least in part on the first and second opcodes.

10. The at least one non-transitory computer-readable medium of claim 7, wherein the instructions are further to cause the computing device to send the block-based compute descriptor over a network using an internet small computer system interface (iSCSI) transport protocol or a non-volatile memory express over fabrics (NVMeOF) transport protocol.

11. The at least one non-transitory computer-readable medium of claim 7, wherein the block-based storage device is a storage server in a disaggregated computing environment.

12. A method of performing an offloaded compute operation, the method comprising:
 identifying a block-based compute descriptor in a received compute offload command, wherein the compute offload command comprises a fused non-volatile memory (NVM) command that includes first and second opcodes, wherein the compute offload command is to be performed in a NVM device, wherein the compute offload command includes information to schedule block-based compute operations against virtual objects in the NVM device, wherein the information includes a block-based compute descriptor that describes the block-based compute operations in a protocol-agnostic fashion applicable to block-based storage systems, wherein the block-based compute descriptor includes storage blocks mapped to the virtual objects that are to be input and output for the block-based compute operations, a requested compute operation against the virtual objects in the NVM device, and a compute type identifier, wherein the first opcode of the compute offload command is to provide a transfer of the block-based compute descriptor from a host to the NVM device, and the second opcode of the compute offload command is to provide a transfer of a result of the requested compute operation to the host from the NVM device; and
 performing the requested compute operation on data in the block-based storage device based at least in part on the compute type and the virtual input object, including performing the requested compute operation against a virtual input object and storing the result of the requested computed operation in the virtual output object, independently from read or write operations that are to occur or are occurring in the NVM device.

13. The method of claim 12, further comprising parsing the block-based compute descriptor.

14. The method of claim 12, wherein a virtual input object includes a list of input blocks and an input length.

15. The method of claim 12, further comprising loading the data from the NVM into a buffer based at least in part on the virtual input object, wherein performing the operation includes performing the operation based at least in part on the data loaded into the buffer.

16. The method of claim 12, wherein the compute type identifier includes an operation code, and the method further comprises:
 comparing the operation code to a list of available operations;
 performing the operation in response to the operation code is included in the list of available operations; and
 returning an error in response to the operation code is not included in the list of available operations.

17. The method of claim 12, wherein the compute type identifier identifies a search, compress, checksum, or resize operation.

18. The method of claim 12, wherein the compute offload command is received over a network using an internet small computer system interface (iSCSI) transport protocol or a non-volatile memory express over fabrics (NVMeOF) transport protocol.

19. At least one non-transitory computer-readable medium comprising instructions stored thereon that, in response to execution of the instructions by one or more processors, cause a computing device to:
 identify a block-based compute descriptor in a received compute offload command, wherein the compute offload command comprises a fused non-volatile memory (NVM) command that includes first and second opcodes, wherein the compute offload command is to be performed in a NVM device, wherein the compute offload command includes information to schedule block-based compute operations against virtual objects in the NVM device, wherein the information includes a block-based compute descriptor that describes the block-based compute operations in a protocol-agnostic fashion applicable to block-based storage systems, wherein the block-based compute descriptor includes storage blocks mapped to the virtual objects that are to be input and output for the block-based compute operations, a requested compute operation against the virtual objects in the NVM device, and a compute type identifier, wherein the first opcode of the compute offload command is to provide a transfer of the block-based compute descriptor from a host to the NVM device, and the second opcode of the compute offload command is to provide a transfer of a result of the requested compute operation to the host from the NVM device; and
 perform the requested compute operation on data in the block-based storage device based at least in part on the compute type identifier and a virtual input object, including perform the requested compute operation against a virtual input object and store the result of the requested computed operation in the virtual output object, independently from read or write operations that are to occur in the NVM device.

20. The at least one non-transitory computer-readable medium of claim 19, wherein the instructions are further to cause the computing device to parse the block-based compute descriptor.

21. The at least one non-transitory computer-readable medium of claim 19, wherein the compute offload command is received over a network with an internet small computer system interface (iSCSI) transport protocol or a non-volatile memory express over fabrics (NVMeOF) transport protocol.

22. The at least one non-transitory computer-readable medium of claim 19, wherein the compute offload command is a SCSI command or a NVMe command received over a local bus.

* * * * *